Jan. 13, 1942.  H. L. POTTER  2,269,684
BEARING
Filed Sept. 11, 1940
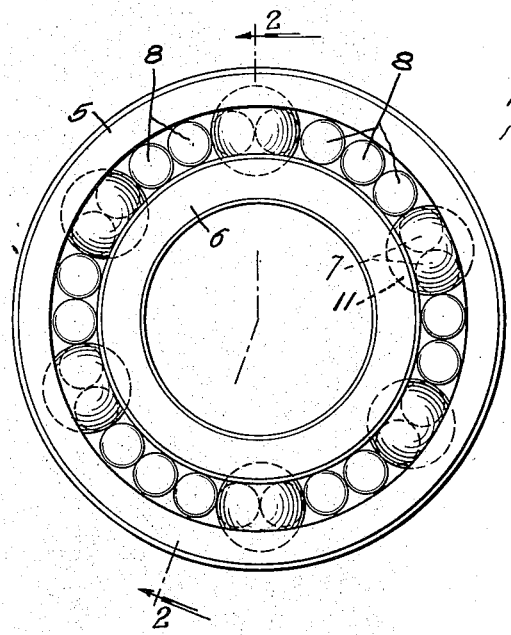
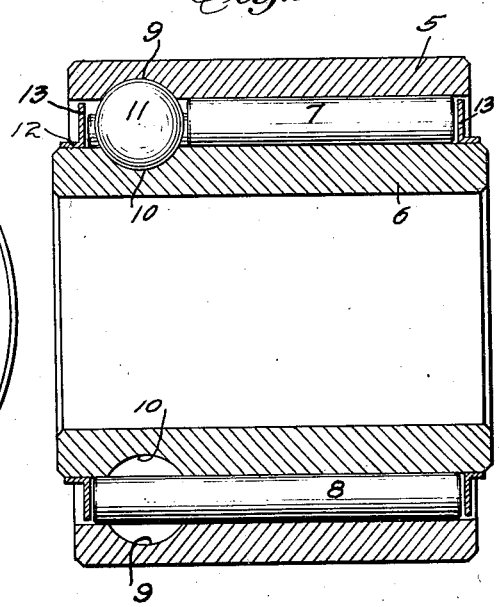
INVENTOR
HOWELL L. POTTER
BY
ATTORNEYS Patented Jan. 13, 1942

2,269,684

UNITED STATES PATENT OFFICE 2,269,684

BEARING

Howell L. Potter, New Britain, Conn., assignor to The Fafnir Bearing Company, New Britain, Conn., a corporation of Connecticut Application September 11, 1940, Serial No. 356,257

6 Claims. (Cl. 308—174)

My invention relates to an anti-friction bearing designed to take relatively heavy radial as well as thrust loads. Roller bearings, for example needle roller bearings, are capable of taking heavy radial loads, but are of themselves capable of taking substantially no thrust loads.

In accordance with my invention a roller bearing is provided with anti-friction bearing means for taking thrusts which the roller bearing itself is incapable of taking.

It is an object of the invention to provide an improved form of combined radial and thrust bearing.

It is a more specific object to provide a unit-handling roller bearing capable of anti-frictionally taking substantial end thrusts.

Another object is to provide a roller bearing with means directly incorporated therewith and forming a part thereof for taking thrust loads.

Other objects and various features of novelty and invention will be hereinafter pointed out or will become apparent to those skilled in the art.

In the drawing which shows, for illustrative purposes only, a preferred form of the invention—

Fig. 1 is an end view in elevation of a bearing, illustrating features of the invention;

Fig. 2 is a sectional view taken substantially in the planes of the line 2—2 of Fig. 1.

In the preferred form shown, the bearing includes an outer bearing ring 5 and an inner bearing ring 6, each of which rings is provided with a cylindrical bearing raceway surface for the interposed roller bearings, such as the needle rollers 7—8. A needle or roller bearing of the type just described will carry very substantial radial loads. The bearing is further provided with anti-friction means for taking thrust loads which the roller bearing alone would be incapable of taking.

In the preferred form, the outer and inner rings are provided with angular contact raceways (in the present instance raceway grooves 9—10) in the outer and inner rings. Angular contact anti-friction bearing members such as balls 11 are carried in the raceways 9—10. The balls 11 preferably have a very loose radial fit in the grooves 9—10 since the rollers 7—8 are designed to take all or substantially all of the radial load applied to the bearing. However, the angular contact raceways 9—10, together with the interposed balls, are designed to take very substantial end thrusts. In the form shown, the ball bearing portion of the improved bearing is of the Conrad type and spacers are provided for the balls. The spacers in the form illustrated are the long rollers or needles 8—8 which extend axially of the bearing between the balls and serve to space the same apart. As illustrated, three adjacent rollers serve to space some of the bearing balls apart, while two rollers space other of the adjacent balls apart. The bearing as a whole, however, is symmetrical. Other designs involving different fixed diameters may involve a greater or less number of spacing rollers.

In the particular design illustrated, the diameter of the balls is substantially a whole number multiple of the diameter of the bearing rollers so that the bearing rollers 8—8 may extend axially alongside of balls so as to space them apart, and intermediate shorter rollers 7—7, which are in effect behind the balls as viewed in Fig. 1, may contact the adjacent long rollers 8—8 at each side of the balls. As illustrated, the balls are located adjacent one end of the bearing and the rollers 8 are long ones extending between the balls and acting as spacers, while the rolls 7 are shorter and are interposed between the balls and the opposite end of the bearing. It will be clear that the raceway grooves 9—10 could be located at any feasible point betwen the ends of the bearing rings and that short rollers such as 7 could be interposed between both ends of the rings and the balls when the latter are located nearer the center of the bearing. Also, short rollers arranged in end to end relation may be substituted for the rollers shown.

Means such as retainers and seals are provided for preventing the rollers from dropping out. In the preferred form each of the seals comprises a sheet metal sleeve member 12 tightly fitting the inner ring 6 and having an outwardly directed flange 13 to serve as a retainer for the bearing rollers and as a seal for the bearing as a whole.

While the bearing constructed as shown herein would not permit of pure rolling motion between the rollers and their raceway surfaces and the balls and their raceway surfaces, it is to be understood that this bearing has its principal application in situations where the rings merely oscillate relatively to each other, and for such service the very slight slippage of, say, the balls will be of no moment. Furthermore, due to the unavoidable or designed looseness of the balls and bearing rollers, there may be true rolling motion of the rollers and the balls during limited rotation of the bearing rings.

It will be seen that I have provided a compact form of bearing capable of taking very heavy radial as well as thrust loads. The bearing is simple in design and construction, very easy to asemble, and very effective in the applications for which the bearing is by its nature fitted.

While the invention has been described in considerable detail and a preferred form illustrated, it is to be understood that various changes may be made within the scope of the invention as defined in the appended claims.

I claim:

1. A bearing of the character indicated including inner and outer race rings having cylindrical raceway surfaces thereon, said raceways intermediate the ends thereof having complementary raceway grooves for balls, bearing rollers interposed between said rings and fitting said cylindrical raceway surfaces, some of said rollers extending between balls in said ball raceway grooves and serving as spacing members for said balls, some of said rollers extending only from the balls to the ends of the rings.

2. A bearing of the character indicated including inner and outer bearing rings having cylindrical raceways for bearing rollers, bearing rollers on said raceways, said rings having complementary ball raceway grooves therein, balls fitting said ball raceway grooves and serving to limit relative endwise movement between said bearing rings, some of said bearing rollers being positioned between adjacent balls in said ball raceway grooves and serving to space the latter apart, others of said rollers being positioned between said some of said rollers and extending only from said balls to the ends of said rings.

3. A combined radial and thrust bearing including a pair of raceway rings having raceway surfaces for bearing rollers, bearing rollers between said rings, said rings having complementary raceway means for bearing balls, bearing balls in said complementary raceway means and serving to limit relative endwise movement between said bearing rings, some of said bearing rollers lying at least in part between adjacent balls for spacing the latter apart, other of said rollers being aligned with said balls and extending only from said balls toward the ends of said rings.

4. A bearing of the character indicated including inner and outer bearing rings having cylindrical raceway surfaces for bearing rollers, bearing rollers between said rings, some of said bearing rollers being of a length different from the length of other bearing rollers, angular contact raceways for anti-friction bearing members in said rings, angular contact anti-friction bearing members in said last mentioned raceways for limiting endwise movement of said bearing rings relatively to each other, some of said rollers extending between adjacent angular contact bearing members for spacing the latter apart.

5. A bearing of the character indicated including inner and outer bearing rings having cylindrical raceway surfaces for bearing rollers, bearing rollers interposed between said bearing rings, said rings having complementary ball raceway grooves therein, balls in said raceway grooves and serving to limit relative endwise movement between said bearing rings, the diameter of said balls being substantially a whole number multiple of the diameter of said bearing rollers, some of said bearing rollers being interposed between adjacent balls and serving to space the latter apart, others of said bearing rollers being axially aligned with said balls between said rings.

6. A bearing of the character indicated including inner and outer race rings having opposed roller raceways, said rings having raceway grooves for balls, balls fitting said raceway grooves, and rollers on said roller raceways at at least one side of said balls and substantially filling said roller raceways circumferentially, some of said rollers being longer than others and extending between adjacent balls in said raceway grooves.

HOWELL L. POTTER.